(12) United States Patent
Wagner et al.

(10) Patent No.: US 6,429,548 B1
(45) Date of Patent: Aug. 6, 2002

(54) PRESSURE SWITCH

(75) Inventors: Dietmar Wagner, Kirchheim/Teck; Jochen Franz, Reutlingen, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/505,035

(22) Filed: Feb. 16, 2000

(30) Foreign Application Priority Data

Feb. 18, 1999 (DE) .......................... 199 06 639

(51) Int. Cl.[7] .............................................. H01H 35/24
(52) U.S. Cl. ........................................................ 307/118
(58) Field of Search ................................ 307/118, 116

(56) References Cited

U.S. PATENT DOCUMENTS

| | | |
|---|---|---|
| 4,977,509 A | 12/1990 | Pitchford et al. |
| 5,182,826 A | 2/1993 | Thomas et al. |
| 5,361,218 A | 11/1994 | Tripp et al. |
| 5,617,515 A | 4/1997 | MacLaren et al. |
| 5,666,815 A | 9/1997 | Aloise |
| 5,790,046 A * | 8/1998 | Blossfeld .................. 307/116 |
| 5,982,047 A * | 11/1999 | Probst et al. ............... 307/118 |

FOREIGN PATENT DOCUMENTS

| | | |
|---|---|---|
| DE | 33 11083 C2 | 9/1984 |
| DE | 44 22 867 A1 | 1/1996 |
| DE | 196 37 607 A1 | 3/1998 |
| EP | 0 302 158 A2 | 11/1987 |
| WO | WO 98/50246 | 11/1998 |

* cited by examiner

Primary Examiner—Fritz Fleming
(74) Attorney, Agent, or Firm—Hoffmann & Baron, LLP

(57) ABSTRACT

A pressure switch is described with a pressure connection (11), with an electrical pressure sensor (19) to generate a pressure-dependent electrical signal, with an operator-device and/or an adjusting device (16–18) to input at least one pressure switch threshold and with at least one electrical switch output (16–18) [sic; 13,14]. The pressure switch can be adjusted by operation of the operator device (16–18) in such a manner that the electrical signal corresponding to the instantaneously applied pressure (p) is saved as the first saved pressure value (S1) and the electrical signal corresponding to a pressure (p) applied temporally thereafter, is saved as a second saved pressure value (S2), where these two saved pressure values (S1, S2) define the pressure switching threshold(s) in the operating mode. Thus, the saved pressure values can be specified very easily and in a variable manner and saved, and a great variability of operating modes is possible.

12 Claims, 2 Drawing Sheets

PRESSURE SWITCH

BACKGROUND OF THE INVENTION

1. Field of the Invention

The invention pertains to a pressure switch with a pressure connection, with an electrical pressure sensor to generate a pressure-dependent electrical signal, with an operator-device and/or an adjusting device to input at least one pressure switch threshold and with at least one electrical switch output.

2. Description of the Prior Art

In known pressure switches the desired switching pressure is adjusted, for example, by means of an adjusting screw or an adjusting potentiometer. More complicated, known solutions feature operator keys and a display, and by means of the operator keys, the desired switching pressure can be programmed, since, for example, the desired pressure value is input as a numeric value. However, in these known pressure switches, the specification of the switching pressure is in general cumbersome and complicated to carry out.

One problem of the present invention consists in creating a pressure switch in which the desired switching pressure can be specified in a simple and yet still variable manner.

SUMMARY OF THE INVENTION

This problem is solved according to this invention, in that the pressure switch can be adjusted by operation of the operator device in such a manner that the electrical signal corresponding to the instantaneously applied pressure is saved as the first saved pressure value and the electrical signal corresponding to a pressure applied temporally thereafter, is saved as a second saved pressure value, where these two saved pressure values define the pressure switching threshold(s) in the operating mode.

In the pressure switch according to this invention, a saved pressure value can be quickly and easily saved, for example, by operation of an operator key or an operator key combination. The input of a numeric value or the setting of an adjusting screw or of a potentiometer is no longer necessary. The particular, applied pressure is taken in this case as a saved pressure value. It proves to be particularly favorable to use two temporally sequential, applied pressures as saved pressure values, in order to specify the pressure switching thresholds in a particularly variable manner.

Favorable refinements and improvements to the pressure switch as described in claim 1 are possible by means of the modifications stated in the subclaims.

The saved pressure values can be saved, preferably by repeated operation of the operator key or of an operator key combination. It has proven to be particularly favorable in this case, that after the first or initial operation, a prompt will appear on a display for an additional, or repeated, operation, or by means of an acoustical and/or optical signal, in particular by means of a light emitting diode. Thus, the operator will be reminded that an additional operation is required.

Alternatively, the saving can also take place by means of one-time operation, and then after a specified time the applied pressure will be accepted as a second, saved value.

The operating key combination consists preferably of an operator key allocated to the switch output, and a program key which is needed anyway in most cases, so that no additional keys are needed.

To achieve a greater variability and to achieve more variable potential applications, the pressure switch has preferably several mutually independent switch outputs, for which two saved pressure values are provided for the save. To each switch output, preferably one operator key is provided.

In addition to its function for saving of the saved pressure values, the operator key is designed in a favorable manner to trigger the display or replay of the value of the switch threshold(s) of the allocated switch output by means of a display or of an optical and/or acoustic signal, in particular of a light emitting diode, so that in particular, different types of operation or differing activation combinations with other operator keys trigger the differing functions of the save and of the display. Different operating modes of this type, can consist for example in that the particular operating key can be operated for different time lengths or in a differing sequence.

To specify the differing operating modes as a function of the saved pressure values, in a favorable manner at least one adjusting and/or programming key is provided. The pressure switch can be used in a highly variable manner, in this case. Preferably in an operating mode as a threshold value switch, the average value of the saved pressure values can be specified as the switching threshold. In one additional operating mode as hysteresis switch, the two saved pressure values can be predefined as on/off switching thresholds. Thus initially, three differing operating modes can be selected. In addition, if a reversing switch is provided for the switch outputs between open mode and closed mode, then a total of six different operating modes can be selected, which all depend on the two saved pressure values.

To specify the desired operating mode, a menu prompt on a display is suitable.

One design example of the invention is presented in the figures, and this example will be explained in greater detail below.

DETAILED DESCRIPTION OF THE INVENTION

Figure 1:
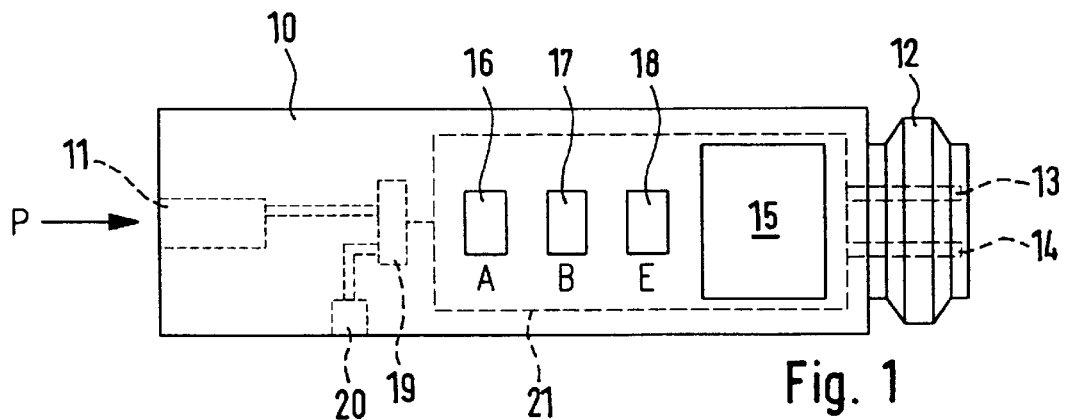
FIG. 1 An external view of one design example of a pressure switch on the operator side FIG. 2 A flow chart to explain the mode of operation FIG. 3 A diagram to explain the operating mode as threshold value switch FIG. 4 A diagram to explain the operating mode as hysteresis switch, and FIG. 5 A diagram to explain the operating mode as a window comparator.

The pressure switch illustrated in FIG. 1 features a housing 10 with round or rectangular cross section, in which on the one face there is a pressure terminal 11 for a pressure line, and on the opposing, face there is an electrical connecting device 12 with two switch outputs 13, 14 designed as contacts. A display 15 and also three operator keys 16–18 are provided on the sides or perimeter wall of the housing 10. In this case, the operator key 16 (A) is allocated to the switch output 13 and the operator key 17 (B) is allocated to the switch output 14. The operator key 18 (E) is designed as a programming key or editing key.

In the interior of the housing 10 there is a pressure sensor 19, which is connected to the pressure connection 11 on the one hand, and to an outside air opening 20 on the other hand. The pressure-dependent, electrical output signal of the pressure sensor 19 is sent to an electronic evaluation device 21, which is connected to the operator keys 16–18, the display 15 and to the switch outputs 13, 14. In this electric evaluation device 21 there is a microprocessor or microcomputer, for example. The power supply can come either from the electric connector device 12 (in a manner not illustrated) or an electric source battery is provided.

The mode of operation of this pressure switch will now be explained with reference to FIG. 2. The essential factor about the operation consists in that two saved pressure values are injected into a memory device of the evaluation unit 21 so that the electric signal corresponding to the particular, applied pressure value p, is saved when a corresponding key command is input. The saving of the pressure values for the switch output 13 takes place with simultaneous operation of the operator keys 16 and 18, and the saved pressure values for the switch output 14 are saved after simultaneous operation of the operator keys 17 and 18.

Specifically, the save of the saved pressure values takes place as follows: In the program run of the evaluation device 21 there is a cyclical query 22 to determine whether the operator keys 16 and 18 or A and E are operated simultaneously. If this is the case, then a first saved pressure value S1 will be saved in the memory process 23 which corresponds to the pressure value p applied at this time. Next, a query 24 occurs to determine whether this key combination is operated again. Thus on the display 15 there will appear a display prompt 25 to operate this key combination again. If the operation occurs again, then the pressure value p applied at this time will be saved in the memory process 26 as the saved pressure value S2.

Figure 2:
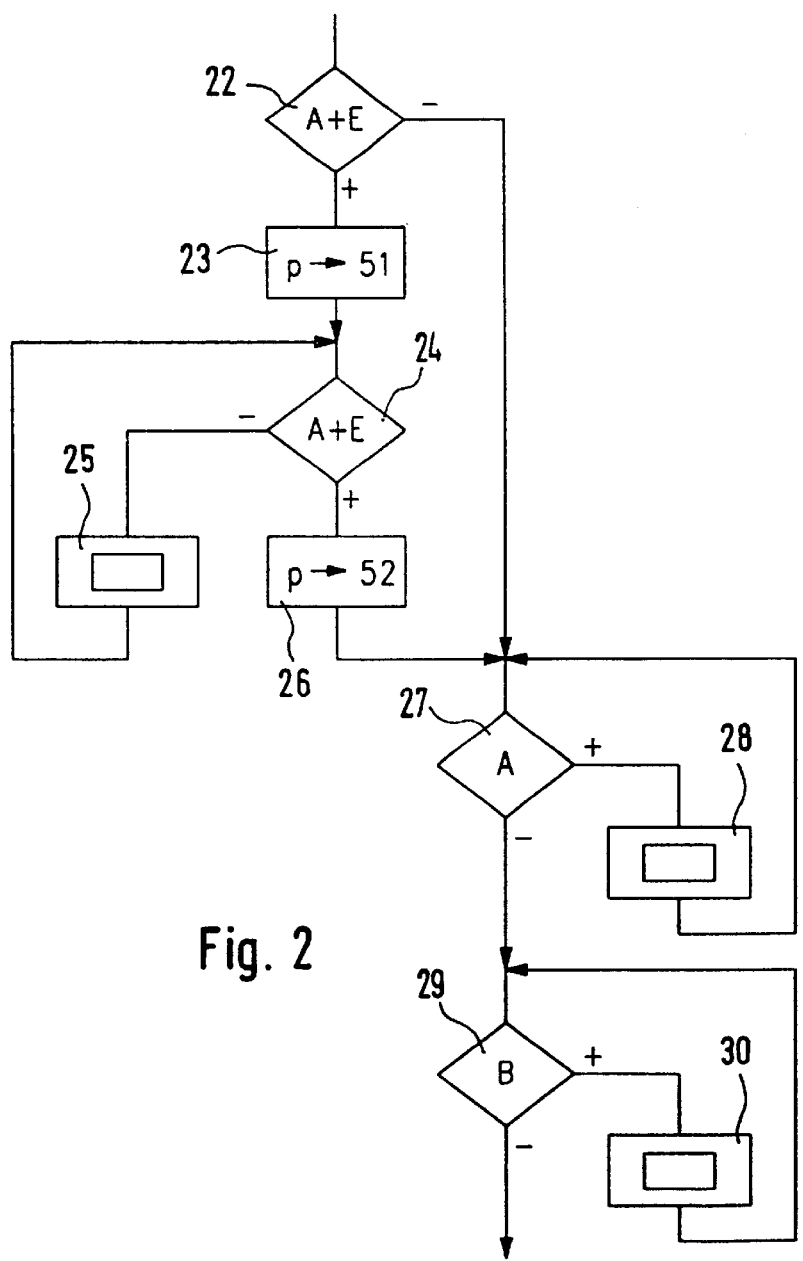

FIG. 2 describes only the save of the two saved pressure values S1 and S2 which are allocated to the switch output 13. The save of two saved pressure values for the switch output 14 takes place in the same manner, so that a simultaneous operation of the keys 17 and 18 or B and E is necessary.

After the save process of the saved pressure values, the program then returns to its normal operating mode. The operator keys 16 and 17 have a double function. If the operation of the operator key 16 or A is ascertained by means of a query 27 in the operating mode, then by means of a replay process 28 on the display 15 it will be possible to ascertain which values are currently adjusted for switch thresholds or hysteresis.

Correspondingly, by operation of the operator key 17 or B by means of a query 29, the settings of the switch output 14 can be queried and correspondingly presented on the display by a replay process 30.

As a modification of the illustrated design example, instead of the display 15, a light emitting diode can be used as part of a more simple design. The prompt for repeat operation of the key combination for input of the second saved pressure value, can take place, for example, by simple flashing of the light emitting diode. Alternatively or additionally, an acoustical signal can be used. Accordingly, to check the switch settings of the switch output 13 or of the switch output 14 by operation of the operator key 16 or of the operator key 17, the light emitting diode can light up, or not light up, according to the switch setting, and here, too, basically also an acoustic signal can be provided.

In an additional, simpler design, only one switch output can be provided, so that in principle a quantity of switch outputs exceeding the number two, can be provided. In this case, the number of operator keys should be increased accordingly.

Instead of the operation of a key combination for saving of the saved pressure values, this can take place, for example, merely with the allocated operator key 16 or 17, so that different operating modes are allocated to these operator keys. For example, a brief operation can be used to check the switch settings of the corresponding switch output, while a longer operation can be used to save the saved pressure values. Also, repeated operation of a key can occur in rapid succession to be used to achieve different operating functions.

The two saved pressure values (per switch output 13, 14) can now be used differently for the different operating modes of the pressure switch. This is explained in greater detail in FIGS. 3 to 5. The setting of the particular operating mode takes place either in a menu-driven mode via the display 15 by means of the operator keys 16–18, or in this case additional operator keys or operator switches (not illustrated) can be provided.

Figure 3:
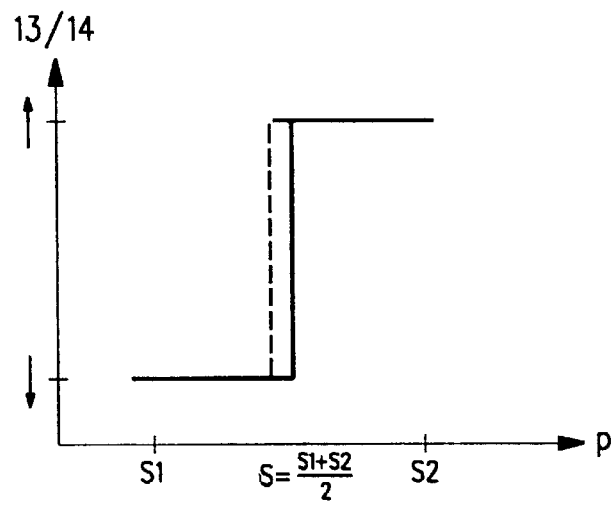

FIG. 3 shows a threshold value switch in the first operating mode. From the two saved pressure values S1 and S2, the average value is formed automatically in the evaluation device 21 and input as a switch threshold, and this switch threshold can be allocated automatically to a hysteresis. Or alternatively, the corresponding switch outputs can be programmed as opened or closed, and in one case, the switch outputs can be opened when the threshold value is reached, and in the other case, they will be closed. The two different saved pressure values can be generated, for example, in that after saving of the first pressure value, a specific leakage is created. Now if only one saved pressure value is to be saved, then by a second operation of the key combination, the same pressure value will likewise be saved twice.

Figure 4:
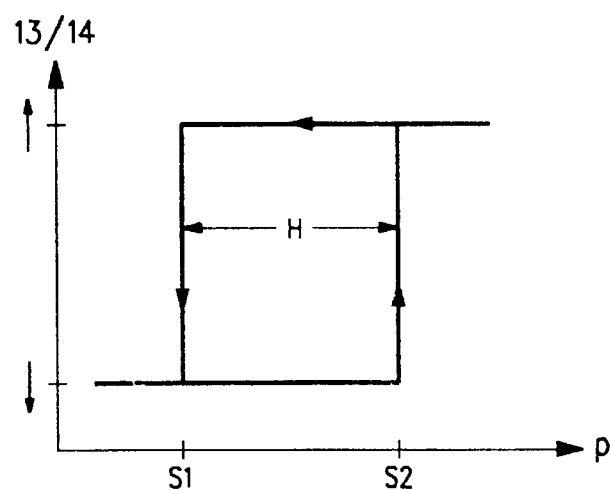

FIG. 4 shows the operating mode as hysteresis switch, in which the larger saved pressure value S2 is specified as a delayed switching threshold and the smaller saved pressure value S1 is defined as reset threshold. Thus, random hysteresis H can be generated. Of course, here, too, open and closed states can be selected between the two alternatives, which leads to an inverting of the corresponding switch outputs.

Figure 5:
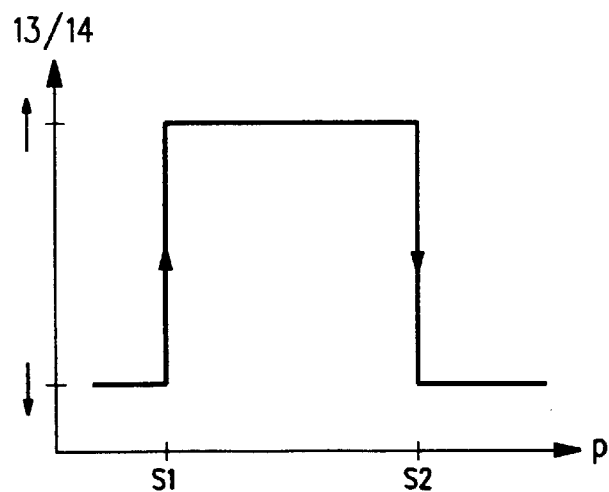

Finally, FIG. 5 illustrates the operating mode as window comparator, in which the smaller saved pressure value S1 is defined as the delayed switching threshold and the greater saved pressure value S2 is defined as the reset threshold. Again, an inverting is also an option.

Overall, under consideration of the potential for inverting, a total of six different operating modes can be selected, and in principle, even more operating modes are possible.

What is claimed is:

1. A pressure switch comprising a pressure connection, an electrical pressure sensor for generating a pressure-dependent electrical signal, an operator-device for inputting one pressure switch threshold and at least one electrical switch output for outputting the at least one pressure switch threshold, wherein the pressure switch can be adjusted by operation of the operator-device in such a manner that an electrical signal corresponding to an instantaneously applied pressure is saved as a first saved pressure value (S1) and an electrical signal corresponding to a pressure applied temporally thereafter, is saved as a second saved pressure value (S2), where these two saved pressure values (S1, S2) define the at least one pressure switch threshold in an operating mode and, wherein the operator device includes at least one operator key for saving the saved pressure values (S1, S2) by repeated operation of the at least one operator key.

2. The pressure switch according to claim 1, wherein after a first operator of the at least one operator key, a prompt will appear o a display for additional operation.

3. The pressure switch according to claim 1, wherein the operator-device includes an operator key allocated to a particular electrical switch output, and a programming key, the operator key and the programming key being operated for saving the saved pressure values (S1, S2).

4. The pressure switch according to claim 1, comprising a plurality of mutually independent electrical switch outputs, each of the electrical switch outputs outputting at least one pressure switch threshold defined by two saved pressure values (S1, S2).

5. The pressure switch according to claim 4, wherein the operator-device includes at least one operator key allocated to each electrical switch output (13, 14).

6. The pressure switch according to claim 1, wherein the at least one operator key is also provided to trigger a display of the value of the at least one pressure switch threshold of the allocated switch output.

7. The pressure switch according to claim 1, further comprising at least one adjusting key for specifying differing operating modes as a function of the saved pressure values (S1, S2).

8. The pressure switch according to claim 7, wherein, in one operating mode an average value of the saved pressure values (S1, S2) can be predefined as a pressure switch threshold.

9. The pressure switch according to claim 7, wherein, in one operating mode, the two saved pressure values (S1, S2) can be predefined as an on/off pressure switch threshold.

10. The pressure switch according to claim 7, wherein, in one operating mode, the two saved pressure values (S1, S2) can be predefined as on/off pressure switch thresholds for a switching window.

11. The pressure switch according to claim 7, wherein a reverse switching is possible between an open mode and a closed mode for the at least one electrical switch output.

12. The pressure switch according to claim 7, further comprising a display for presenting a menu to select a desired operating mode.

* * * * *

UNITED STATES PATENT AND TRADEMARK OFFICE
CERTIFICATE OF CORRECTION

PATENT NO.    : 6,429,548 B1                                           Page 1 of 1
DATED         : August 6, 2002
INVENTOR(S)   : Wagner et al.

It is certified that error appears in the above-identified patent and that said Letters Patent is hereby corrected as shown below:

Column 4,
Line 67, now reads "appear o a display" was correctly presented in the Amendment, dated November 14, 2001, (Claim 4 as amended) and should read -- appear on a display --.

Signed and Sealed this

Tenth Day of December, 2002

JAMES E. ROGAN
*Director of the United States Patent and Trademark Office*